United States Patent [19]

Poncet

[11] 3,905,741

[45] Sept. 16, 1975

[54] HYDRAULIC PRESS FOR MOLDING PLASTIC MATERIALS

[76] Inventor: Pierre Poncet, 12 bis, rue Trarieux, Lyon 3eme, France

[22] Filed: Oct. 25, 1973

[21] Appl. No.: 409,616

[30] Foreign Application Priority Data
Oct. 27, 1972 France .............................. 72.38860

[52] U.S. Cl. .. 425/450.1; 425/451.7; 425/DIG. 221; 425/DIG. 223; 425/242
[51] Int. Cl.² ............................................ B29F 1/06
[58] Field of Search ............ 425/242, 450 R, 450 C, 425/DIG. 221, DIG. 222, DIG. 223, 450.1, 451.7

[56] References Cited
UNITED STATES PATENTS

| | | | |
|---|---|---|---|
| 2,689,978 | 9/1954 | Roger | 425/DIG. 223 |
| 2,718,663 | 9/1955 | Roger | 425/450 R |
| 2,976,569 | 3/1961 | Quere et al. | 425/DIG. 221 |
| 3,156,014 | 11/1964 | Wenger | 425/DIG. 223 |
| 3,263,277 | 8/1966 | Ohlendorf et al. | 425/DIG. 223 |
| 3,270,372 | 6/1966 | Hesse | 425/450 R |

FOREIGN PATENTS OR APPLICATIONS

| | | | |
|---|---|---|---|
| 1,227,642 | 10/1966 | Germany | 425/242 |
| 2,018,874 | 11/1971 | Germany | 425/450 R |

*Primary Examiner*—J. Howard Flint, Jr.
*Attorney, Agent, or Firm*—Dowell and Dowell

[57] ABSTRACT

A hydraulic press for molding plastic materials and the like, of the type in which the moving platen is controlled by at least one long stroke approach ram, and also by at least one short stroke clamp ram which, when the mold is closed by the approach ram, acts on at least one pushbar interposed between the moving platen of the press and a stationary plate, while at the time of opening of the mold, means allow the pushbars to pass through the openings of the stationary platen, the clamp ram (11, 12), which is integral with the moving platen (6) of the press, passing freely in a known fashion through an opening (2a) of the stationary plate (2) to open the mold (7, 8), and blocked in front of the said opening by a retractable stop device (13) in order to assure the clamping of the mold after the closing thereof by the approach ram (9, 10), thus acting as a retractable, extensible pushplate between the two plates.

8 Claims, 18 Drawing Figures

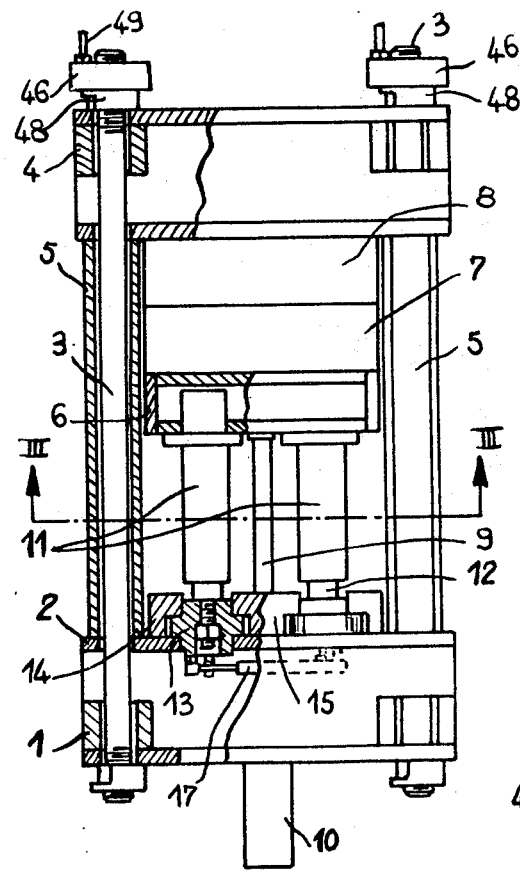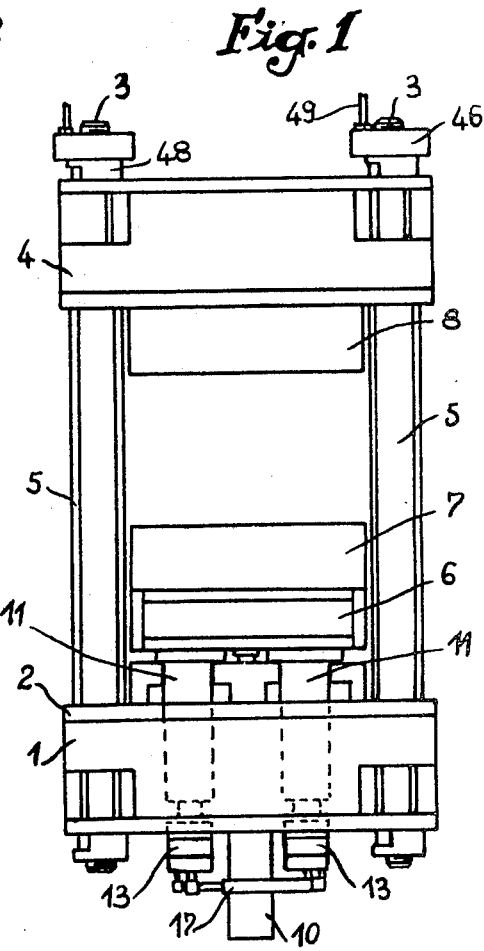
Fig. 2
Fig. 1

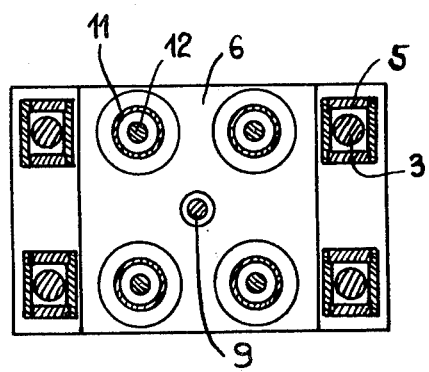
Fig. 3
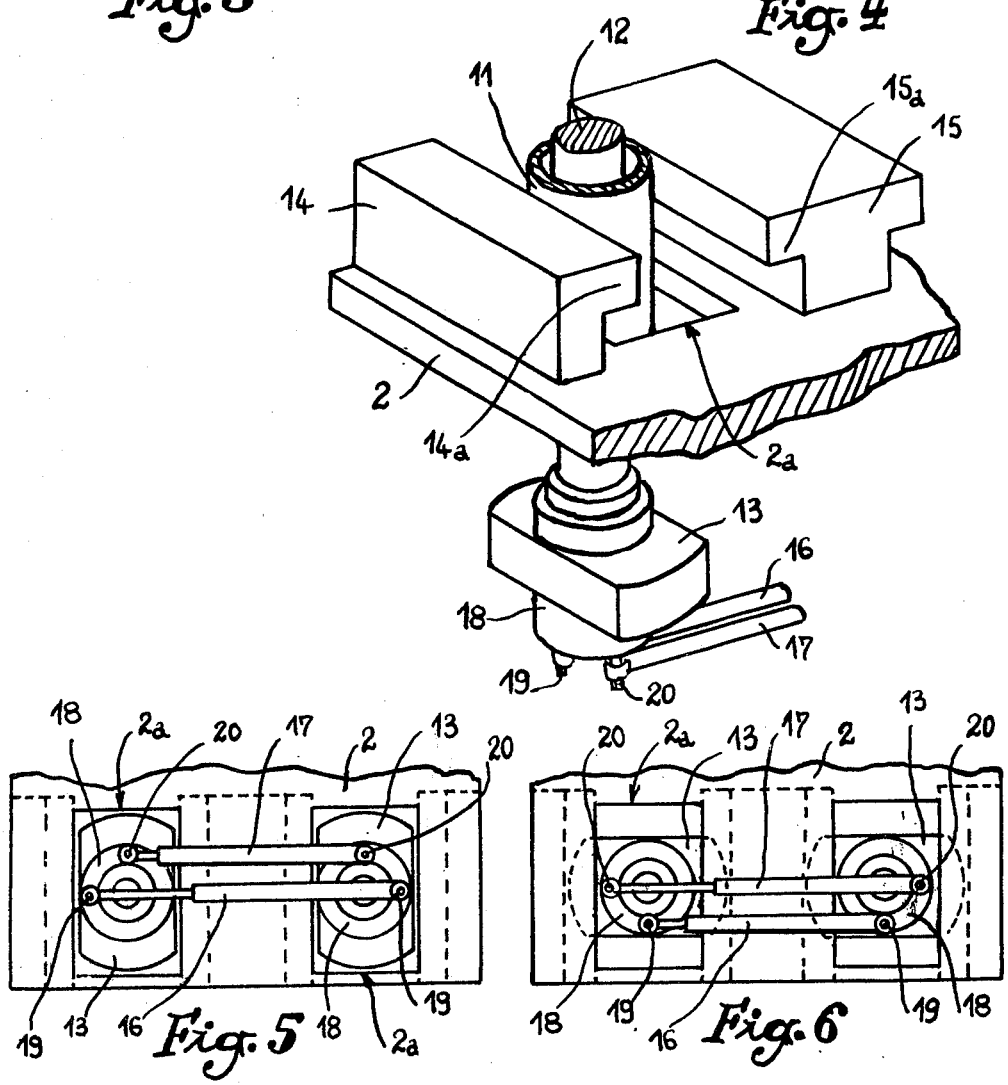
Fig. 4
Fig. 5
Fig. 6

HYDRAULIC PRESS FOR MOLDING PLASTIC MATERIALS

DESCRIPTION OF THE INVENTION

The present invention concerns hydraulic presses for molding by injection or by compression, especially for thermoplastic or thermosetting materials.

It is known that in the presses of the type in question the movable platen should be able to execute a relatively important stroke in order to permit the removal of the product when the mold is opened, while forces required to close the latter are considerable.

In order to avoid the disadvantages associated with the use of large section, long stroke hydraulic rams consideration was given to equip the press with an approach ram providing for the totality of the stroke, and with one or several clamping rams operated only at the end of the mold closing stroke in order to supply the necessary forces. Means retract the ram or rams in order to allow the complete retraction of the movable platen without retraction thereof to the same extent. Thus, in his previous French Pat. No. 1,074,920 of Feb. 18, 1953, the applicant proposed attaching to the movable platen a clamping ram integral with pushrods abutted on stops moved out of the way by rotation about the axis of the press, thus uncovering passages through which the pushrods can then be freely retracted. It can be seen that with an arrangement like this the clamping ram can be provided with a very reduced stroke, thus requiring only a very limited volume of hydraulic fluid, and gaining all the related advantages.

However, even with this arrangement, the clamp ram is a relatively large element part which augments the dimensions of the press.

According to the invention, in a molding press of the type in which at least one clamp ram integral with the movable platen abuts on a stop cleared away by a pushrod, the said ram is set up so as to constitute the pushrod itself, and thus to move to the level of the part of the device which remains fixed longitudianlly on the press frame during the opening stroke.

In the drawings:

FIG. 1 is an elevation of a press according to the invention, the elements being shown in the open position of the mold;

FIG. 2 is a view similar to that of FIG. 1, but in half section and the mold in closed position;

FIG. 3 is a horizontal section along line III—III (FIG. 2);

FIG. 4 is a detailed perspective view on a larger scale showing the lower part of a clamping ram with corresponding locking device;

FIGS. 5 and 6 are plan bottom views showing the locking bars of two adjacent clamping rams, one in unlocked position and the other in locked position;

Figure 9:
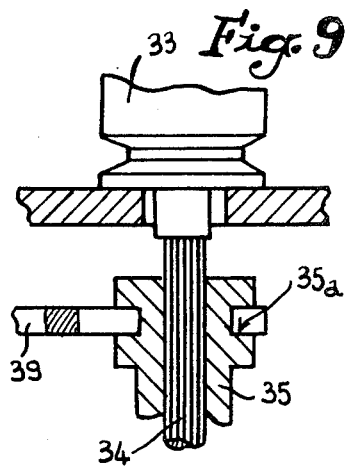
Figure 8:
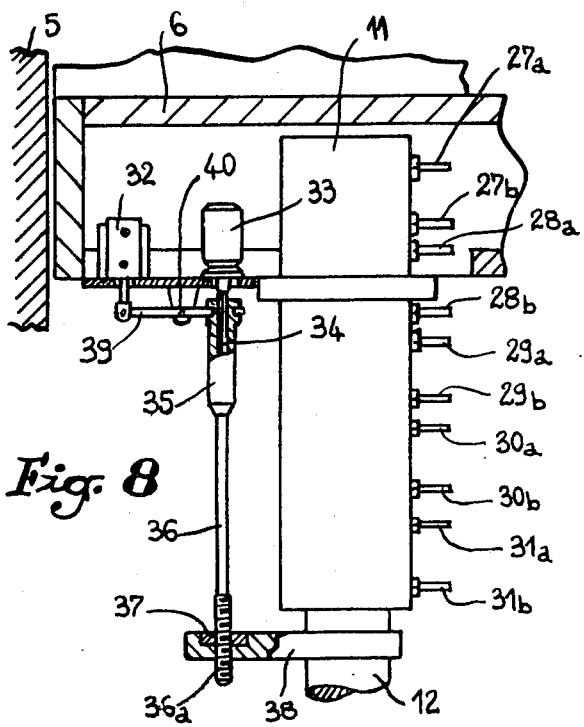
FIG. 8 is a partial elevation with a section showing the servo control mechanism of a clamp ram.
Figure 10:
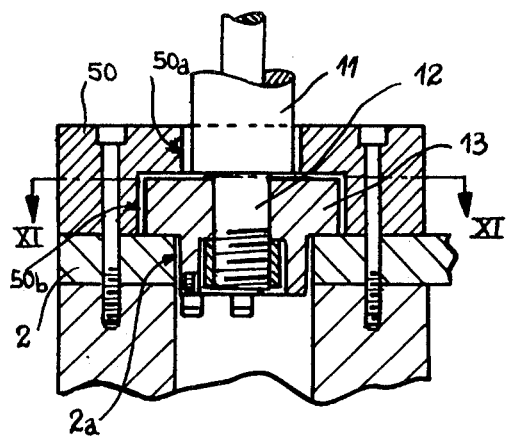
Figure 11:
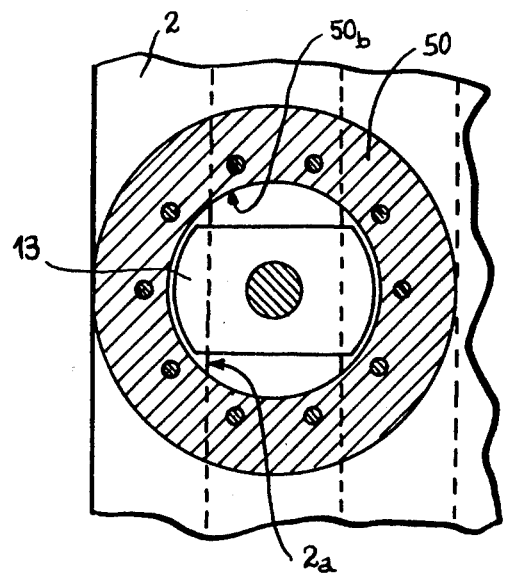
Figure 12:
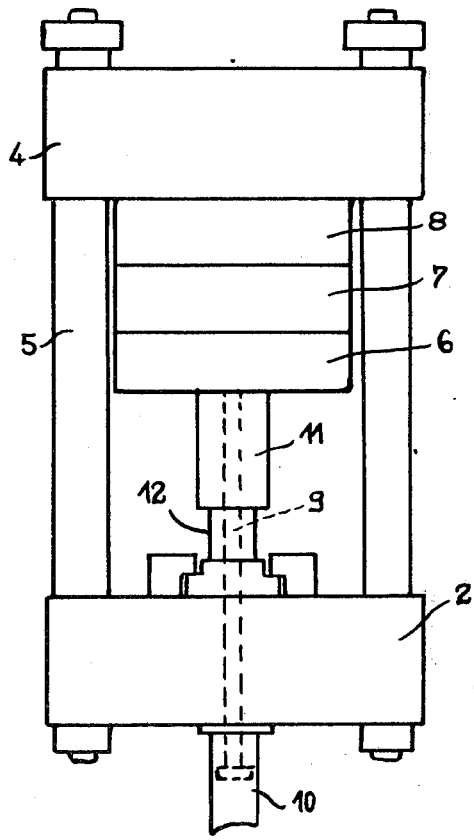
Figure 13:
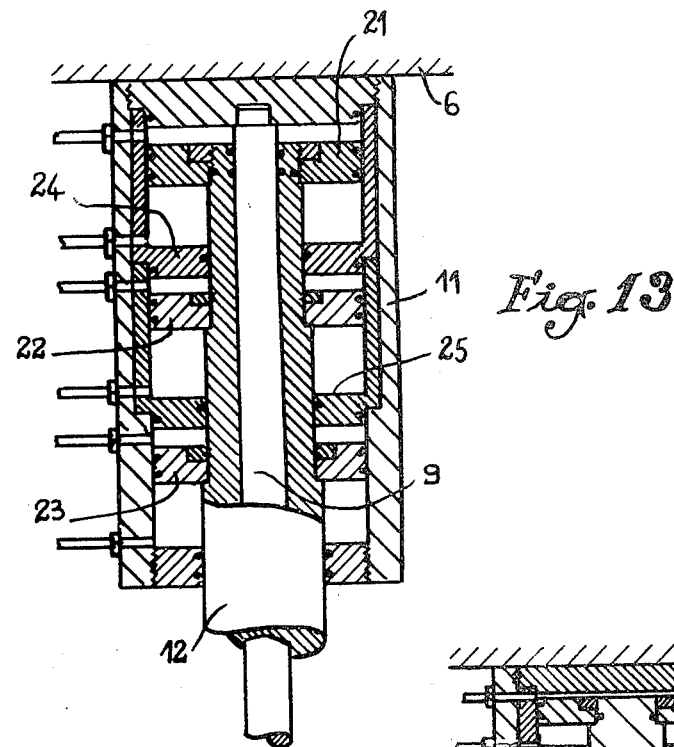
Figure 14:
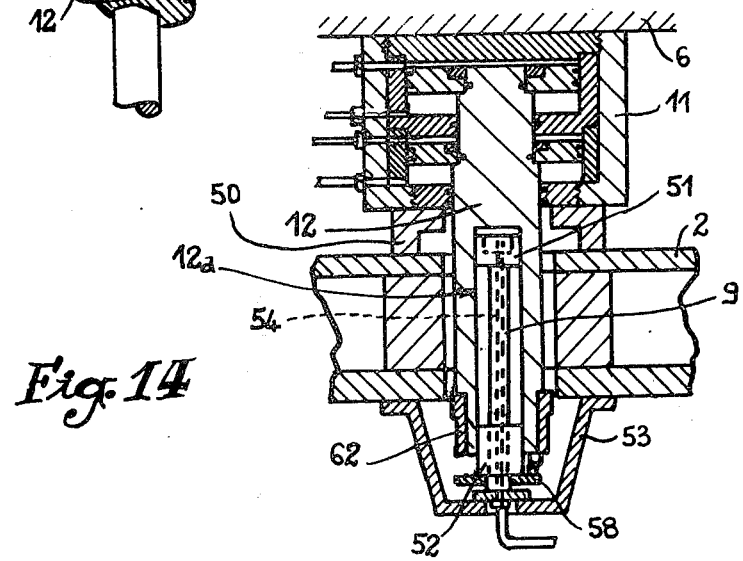
Figure 15:
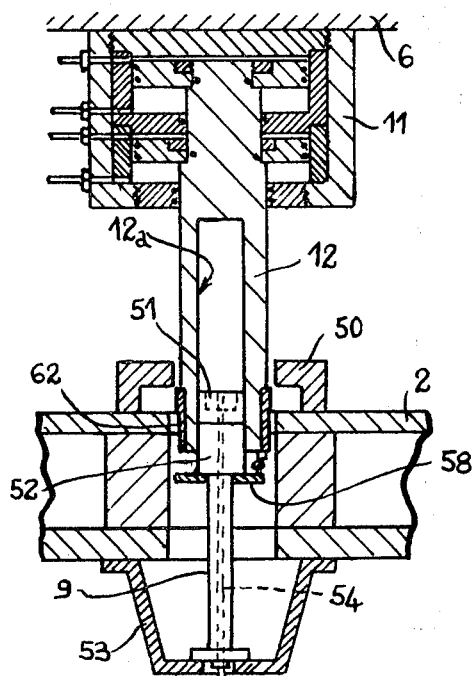
Figure 16:
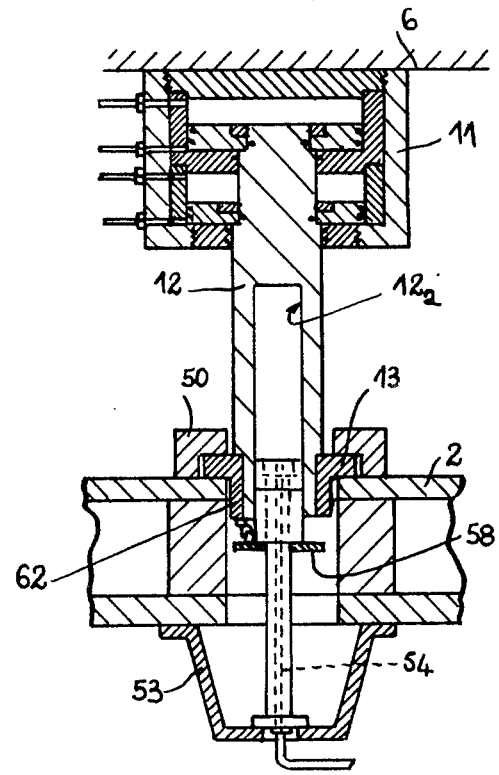
Figure 17:
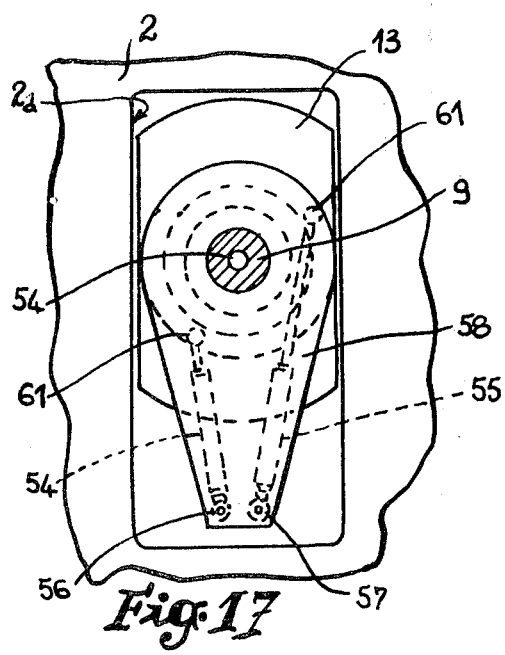
Figure 18:
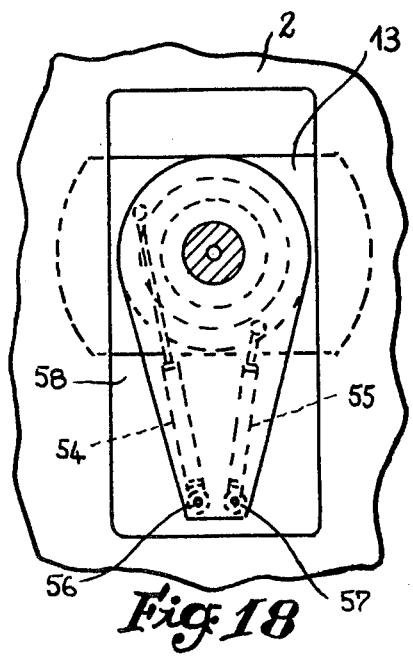

FIG. 9 reproduces a part of FIG. 8 on a larger scale;

FIG. 10 is a vertical section of detail showing a modification of the locking device of a clamping ram;

FIG. 11 is a horizontal section along line XI—XI (FIG. 10);

FIG. 12 is a schematic elevation of a press according to the invention with a single clamp ram and an approach ram also placed along the axis of the press, under the clamp ram;

FIG. 13 is a partial vertical section on a larger scale of the ram system of the press of FIG. 12;

FIG. 14 to 16 are sections showing a modification in which the approach ram is situated inside the rod of the single clamp ram. The elements are shown in three successive positions of their operating cycle; and FIGS. 17 and 18 are plan views showing a system of rams controlling the locking bar in their two stroke end positions in the case of a single axial clamp ram.

The press shown in its entirety in FIG. 1 to 3 comprises a base 1 made of two cross-pieces on which a bottom plate 2 rests. The said base carries four columns 3 which support press head 4 in a way to be described later. Each of these columns is surrounded by a vertical tube 5. Between tubes 5 a moving platen 6 moves vertically. On its upper face the lower half 7 of the mold is attached, the other half 8 being attached under head 4. The rod 9 of a long stroke approach ram whose cylinder 10 extends below base 1 is coupled to the lower face of plate 6.

To the lower face of the moving platen 6, hollow in the example shown, there are also fixed the ends of the cylinders 11 of four clamp rams of which the rods 12 are adapted either to rest on bottom plate 2 in order to provide for the closing pressure of mold 7,8 (the position of FIG. 2), or on the contrary to pass through the bottom plate in such a way as to permit the lowering of lower half 7 for a long opening stroke (position of FIG. 1).

FIG. 3 shows clearly the arrangement in plan view of the columns, the vertical tubes, and teh rams. Columns 3 and their tubes 5 are located at the corners of a rectangle, and clamp rams 11,12 are at the corners of a square within the said rectangle, while approach ram 9 is located on the vertical of the common center of the rectangle and of the square.

As FIG. 4 shows, the rod 12 of each of the clamp rams carries on its end a transverse bar 13 in the form of a rectangle of which the small sides are curved in a circular arc. Bar 13 is rotatably mounted on the said rod and its width is substantially equal to the outer diameter of the cylinder 11 of the corresponding ram 11,12. On the other hand bottom plate 2 is provided along the axis of each ram 11,12 with a rectangular opening 2a with the same dimensions as bar 13 associated with the ram in question, augmented by an appropriate amount of play. On both sides of this opening bottom plate 2 carries two small bars 14,15. Disregarding the play, the distance between the bottoms of these two bars is equal to the length of bar 13. The tops of the said bars have a projecting part or flange, and the space between their opposing faces is equal to the width of said locking bar. It will be observed that the bar 14 closest to tubes 5 has only one flange 14a oriented towards the middle, whereas bar 15 has the shape of a T with two flanges 15a adapted to cooperate with the bars of the two adjacent rams 11,12.

When bars 13 are aligned with openings 2a they can pass through them freely and the same applies to the cylinders 11 or rams 11,12. Moving platen 6 can thus be freely lowered to the position of full opening of mold 7,8 as shown in FIG. 1. But when the mold has been closed completely or nearly completely by the action of approach ram 9,10, bars 13 can be turned by 90° in such a way that their ends move to a position between the bottom plate 2 and flanges 14a, 15a in the way shown in FIG. 2. It is then possible to operate jacks 11,12 to provide for the thrust necessary for the complete closing of the mold and to keep it in the closed position in spite of the reactions due to the molding operation.

It will be seen that because of the presence of flanges 14a, 15a rams 11,12 can be retracted to start the opening of the mold without requiring this force from approach ram 9,10, the role of which is thus limited to displace moving platen 6 without load.

For rotation, plates 13 are connected in pairs by simple acting auxiliary rams 16,17 (FIGS. 5 and 6), which are pivoted on them in the manner of link rods. For this purpose each bar 13 is integral with a kind of lower cylindrical hub 18 having two pivot pins 19,20 oriented downwards at an angle of 90° from each other. When ram 16 is extended, while ram 17 is simply connected to the reservoir, ram 16 moves substantially along the line of the axes of rotation of the two bars. For this angular position of hubs 18 bars 13 are oriented along the axis of the openings 2a through which they can pass freely; they are thus at this time in "retracted" position. If, on the contrary, ram 17 is operated by connecting ram 16 to the reservoir, the hubs 18 are rotated by 90°, which brings bars 13 to the active position shown in FIG. 6 wherein clamp rams 11,12 come into contact with bottom plate 2. Thus, a very simple and effective hydraulic control of bars 13 is achieved.

Figure 7:
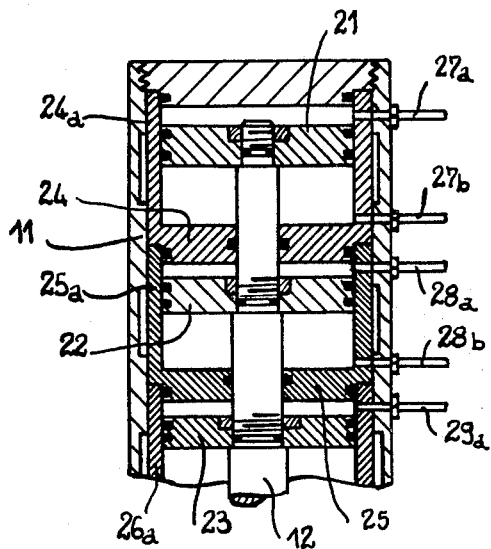
FIG. 7 is a partial longitudinal section of one of the clamp rams.

To provide for small diameters of the cylinders 11 of the clamp rams without requiring the use of hydraulic fluid under an abnormally high pressure, in the press of the invention, the rod 12 of each ram carries several pistons such as 21, 22 and 23 (FIG. 7) and the interior of cylinder 11 is divided into an equal number of corresponding spaces by transverse walls such as 24 and 25. In the example shown, each wall is integral with a liner 24a, 25a, 26a. The axial stacking of these liners assures the retension of the walls and facilitates the construction. Each piston and the space corresponding to it constitute an elementary ram connected to a common distributor by lines such as 27a, 27b, 28a, 28b, etc. All these elementary rams thus arranged in tandem on rod 12 add their thrusts on the said rod in such a way that it is possible to obtain for each composite ram 11,12 a very strong resulting thrust with a relatively small diameter without having to use a hydraulic fluid under an abnormally high pressure. In the example shown in FIG. 8 ram 11,12 includes five elementary rams in such a way that its diameter can be approximately equal to that of an equivalent standard ram, divided by $\sqrt{5}$, which corresponds to a decrease of more than 50 percent.

With each clamp ram 11,12 there is associated an individual distributor 32 (FIG. 8) which is controlled by a mechanism comparing the real stroke of the ram with a value determined at each instant for all the clamp rams of the press. In the structure shown, this mechanism comprises an electric servomotor 33 (FIGS. 8 and 9) of determined angular deplacement, for example of the "step by step" type. This motor is vertically mounted and comprises a ribbed output shaft which slides in a grooved sleeve 35 integral with a rod 36 of which the lower, threaded end 36a screws into a nut 37 integral with a bracket 38 fixed to rod 12 of the ram. Moreover, sleeve 35 has a groove 35a into which a fork engages which is integral with one of the arms of a lever 39 pivoted at 40 on platen 6 and of which the other arm is connected to distributor 32 which is likewise carried by platen 6.

It is evident that aside from plays and dead strokes, for a determined angular positon of motor 33 there is only one level in the position of screw 36a; and consequently of sleeve 35, for which distributor 32 is located in its intermediate closed position. If the screw is too high, the distributor is operated in the direction corresponding to the extension of the ram, i.e., to the lowering of the bracket 38, of the screw and of the sleeve. If the said screw is too low, the reverse takes place. As a result, ram 11,12 is positively controlled as motor 33 rotates sleeve 35 and screw 36a; to maintain the said screw in a position of constant height regardless of its displacement relative to nut 37. If in these conditions the four motors 33 corresponding to the four rams 11,12 are controlled simultaneously and synchronously the latter will move identically by the same quantities even if the resultant of the reactions which the clamping of the mold applies to moving platen 6 is very strongly eccentered in relation to the latter.

Of course motors 33 could be replaced by any devices assuring synchronism in the rotation of sleeves 35 and screws 36a, for example by sprockets on which a suitably driven chain is wound. It is moreover apparent that many other arrangements can be imagined which would be suitable to compare the relative position of platen 6 with a value determined at each instant and to derive therefrom a differential signal to operate the distributor 32.

FIGS. 10 and 11 show a modification of the locking device associated with each of the clamp rams of the press. Here we have again a bar 13 rotatably mounted on the rod 12 of the ram so that it can pass through the opening 2a in the bottom plate 2 when it is oriented along the major axis of the latter, but retained, on the other hand, by the edges of the opening when in a different orientation. The bars 14 and 15 of FIG. 4 are replaced by a circular cap 50 bored in two diameters 50a, 50b in order to receive the body 11 of the ram and bar 13 itself.

The arrangement of FIGS. 10 and 11 is more particularly, but not exclusively, applicable to the case of a single clamp ram set up along the axis of the press to constitute a structure which is advantageous in certain cases, especially when the clamping reactions are regularly distributed. With such a layout several approach rams could normally be provided all around the axial clamp ram. But, according to the invention, the single approach ram can be retained more simply by causing it to act through the clamp ram rod which is then made to be tubular. FIG. 12 and 13 show such an embodiment for the case of a clamp ram 11 comprising several elements in tandem as in FIG. 7. The rod 12 of this ram is tubular and the rod 9 of approach ram 10 extends through it. The end of this rod 9 is fixed to the upper end face of clamp ram 11. It is apparent that the presence of rod 9 does not impede the operation of ram 11.

The disposition of FIGS. 12 and 13 obviously requires that the cylinder 10 of approach ram be situated entirely below the furthest point of the descending stroke of the rod 12 of the clamp ram, taking into account the part of the locking device mounted at the lower end of the said rod. Sometimes this can require the digging of a well of excessive depth which could constitute a disadvantage. This disadvantage can be avoided by situating the cylinder of the approach ram inside the rod of the clamp ram, if the diameter of the said rod is sufficiently large. FIGS. 14 to 16 show such an embodiment in which the rod 12 of the axial clamp ram 11 is bored at 12a in order to receive the piston 51 of the approach rod of release rod 9 extends through a removable base 52 and is fixed to a V-shaped bracket 53 attached under bottom plate 2. The feeding of the upper chamber of this ram takes place through a passage 54 in rod 12 and piston 51. It will be observed that such a ram operates with a fixed piston and a moving cylinder.

FIG. 14 represents the elements in the position of maximum opening of the mold, the cylinder 11 of the clamp ram (provided with two elements only to simplify the drawing) resting on bottom plate 2. FIG. 15 corresponds to the end of the ascending stroke of the approach ram whose cylinder constituted by rod 12 is raised to the maximum. At this instant plate 13 is moved to the locked positon shown in FIG. 16, the clamp ram 11 is operated in order to apply the two halves of the mold against each other.

In the case of a single axial clamp rod it is obviously impossible to adopt the disposition of FIGS. 5 and 6 in order to rotate the locking bar, but it is possible to utilize a similar system comprising two rams 54, 55 (FIGS. 17 and 18) pivoted at 56 and 57 on a plate 58 fixed to base 52 and also connected at 60 and 61 to a sleeve fixed to the bar. Points 60 and 61 are at an angle of approximately 135° from each other. Rams 54, 55 can easily be made of such a size that when one of them is fully extended, the other is connected to the reservoir, and bar 13 is either in the unlocked position of FIG. 17 (which corresponds to FIG. 15) or in the locked position of FIG. 18 (which corresponds to FIG. 16).

I claim:
1. In a hydraulic molding press including:
    a frame;
    a stationary platen fixed to said frame to support a first portion of a mold formed of two portions;
    a movable platen disposed parallel to said first platen and supporting the second portion of said mold, said movable platen being reciprocable in said frame towards and away from said stationary platen to close or open said first and second mold portions with respect to each other;
    long stroke approach ram means fixed to said frame to actuate said movable platen to opened and closed positions of said mold;
    a stationary plate having at least one opening therethrough and the plate being fixed to said frame;
    short stroke clamping ram means having cylinder means attached to said movable platen and having piston rod means extending toward said at least one opening in said stationary plate when said mold has been closed to maintain said mold portions against each other;
    and locking means operative to block said piston rod means of the clamping ram means with respect to said stationary plate during operation of said clamping ram means;
    the improvement comprising in said molding press said locking means being carried by the piston rod means, and said at least one opening through said stationary plate being located and of such size that the piston rod means and the locking means and the cylinder means of the corresponding clamping ram means when the locking means is unblocked can pass freely through said at least one opening in the stationary plate and extend on the other side of the plate from said stationary platen during displacement of said movable platen by the approach ram means to fully open position of said mold.

2. A hydraulic molding press as claimed in claim 1, wherein said at least one opening comprises multiple openings and wherein said clamping ram means comprises multiple clamping rams disposed in parallel relationship for operation between said movable platen and said stationary plate when their piston rod means are locked thereto.

3. In a hydraulic molding press as claimed in claim 1 said at least one opening through said stationary plate being cross-sectionally elongated in shape with a width greater than the outer diameter of the cylinder means, and said locking means which is carried on said piston rod means comprising an elongated bolt rotatably mounted on the piston rod means, the bolt being passable through the associated opening for at least one angular position of said bolt with respect to said at least one opening but blocking against said stationary plate for any other angular position.

4. In a hydraulic molding press as claimed in claim 3:
    said stationary plate having a side which faces said movable platen to engage and block said bolt;
    said at least one opening of said stationary plate being of generally rectangular shpae with two long edges and two short edges;
    said bolt also being of generally rectangular shape with two long edges and two short edges, the distance between the long edges of said bolt forming the width thereof, and said bolt having a given thickness in the vicinity of its short edges;
    and said stationary plate having on said side thereof abutment means extending along both edges of said at least one opening, said abutment means being spaced from said side of said stationary plate to receive the thickness of said bolt in the vicinity of the short edges thereof, whereby when a bolt is in position to engage said side of said stationary plate, rotation of said bolt through 90° brings the short edges thereof between the long edges of said at least one opening and said abutment means to support the piston rod means of said clamping ram means and render the ram means operative to retract said movable platen in the direction corresponding to the opening of said mold.

5. In a hydraulic molding press as claimed in claim 1, wherein said clamping ram means comprises multiple clamping rams having piston rods and cylinders,
    synchronizing means to determine for said multiple clamping rams a uniform rate of relative displacement between their piston rods and cylinders;
    an individual distributing valve associated with each one of said clamping rams to control same;
    and comparator means responsive to the difference between the actual relative position of the cylinder and piston rod of each one of said rams and the relative position prescribed by said synchronizing means.

6. In a hydraulic molding press as claimed in claim 5:
    each of said clamping rams including a first and a second element rectilinearly movable with respect to each other;

said synchronizing means including for each one of said clamping rams:
 a. an individual servo-motor;
 b. a first screw-threaded member rotated by said servo-motor, said first screw-threaded member having an axis parallel to the relative displacement of the first and second elements of the associated clamping ram, and being reatined axially with respect to said first element;
and said comparator means comprising a second screw-threaded member relatively displaceable upon rotation of said first screw-threaded member, said second screw-threaded member being carried by said second element of said clamping ram, the distributing means associated with said ram being actuated by the linerar displacement of said first screw-threaded member relative to said first element of said clamping rams.

7. A hydraulic molding press comprising:
a frame;
a stationary platen fixed to said frame to support the first one of the two portions of a mold;
a movable platen to support the second portion of the mold, said movable platen being disposed parallel to said stationary platen and being reciprocable in said frame towards and away from said stationary platen;
and at least one ram to actuate said movable platen, said ram including:
 a. a cylinder having a first and a second end;
 b. a number of pistons slidable within said cylinder in fluid-tight relation with respect thereto;
 c. a number of partitions including intermediate partitions disposed between successively adjacent pistons, said partitions being fixed and sealed to said cylinder in fluid-tight relation thereto;
 d. a common piston rod reciprocably passing in fluid-tight relation through the first end of said cylinder and through successive intermediate partitions, with said pistons being attached to said common rod;
 e. and means to selectively pressurize spaces within said cylinder, said spaces being defined on one side by one of said pistons and on the other side by a partition.

8. In a hydraulic molding press as claimed in claim 7, said cylinder comprising an outer casing having an inner cylindrical bore, with said first and second ends of the cylinder being fixed to said casing; and a number of cylindrical sleeves disposed in succession within said bore between said first and second ends, each of said sleeves having a first and a second end; and some at least of said intermediate partitions being secured to the first ends of said sleeves.

* * * * *